US009401774B1

(12) United States Patent
Mineo et al.

(10) Patent No.: US 9,401,774 B1
(45) Date of Patent: Jul. 26, 2016

(54) LIMITED WAVELENGTH ALL-TO-ALL WAVELENGTH ROUTING NETWORK CONFIGURATION

(71) Applicant: The United States of America as represented by the Director, National Security Agency, Washington, DC (US)

(72) Inventors: Christopher A. Mineo, Laurel, MD (US); Sung-Joo Ben Yoo, Davis, CA (US); Ke Wen, Davis, CA (US)

(73) Assignee: The United States of America as represented by the Director, National Security Agency, Washington, DC (US)

( * ) Notice: Subject to any disclaimer, the term of this patent is extended or adjusted under 35 U.S.C. 154(b) by 0 days.

(21) Appl. No.: 14/120,661

(22) Filed: May 5, 2014

Related U.S. Application Data

(60) Provisional application No. 61/819,370, filed on May 3, 2013.

(51) Int. Cl.
| H04B 10/27 | (2013.01) |
| H04Q 11/00 | (2006.01) |
| H04J 14/02 | (2006.01) |
| H04L 12/24 | (2006.01) |

(52) U.S. Cl.
CPC ............ *H04J 14/0227* (2013.01); *H04B 10/27* (2013.01); *H04L 41/0823* (2013.01); *H04Q 11/0005* (2013.01); *H04Q 2011/0022* (2013.01)

(58) Field of Classification Search
CPC .............. H04N 10/27; H04Q 11/0005; H04Q 2011/0022; H04J 14/0227; H04L 41/0823

USPC ................................................ 398/48, 49, 82
See application file for complete search history.

(56) References Cited

U.S. PATENT DOCUMENTS

| 7,522,837 | B2 * | 4/2009 | Tanobe et al. .................... 398/63 |
| 8,315,522 | B2 * | 11/2012 | Urino ...................... H04J 14/02 398/68 |
| 9,225,454 | B1 * | 12/2015 | Liu .......................... H04J 14/02 |
| 2006/0051094 | A1 * | 3/2006 | Moriwaki et al. .............. 398/84 |
| 2006/0153496 | A1 * | 7/2006 | Tanobe et al. .................... 385/24 |
| 2009/0324243 | A1 * | 12/2009 | Neilson ......................... 398/154 |
| 2013/0315526 | A1 * | 11/2013 | Krishnamoorthy et al. .... 385/14 |
| 2013/0330076 | A1 * | 12/2013 | Liboiron-Ladouceur H04J 14/0223 398/47 |

OTHER PUBLICATIONS

Bruck, J. et al.; Efficient Algorithms for All-to-All Communications in Multiport Message-Passing Systems; IEEE Transactions on Parallel and Distrubuted Systems; Nov. 1997; p. 1143- ; vol. 8; No. 11.
Jang, I. et al.; Simple Approaches of Wavelength Registration for Monolithically Integrated DWDM Laser Arrays; IEEE Photonics Technology Letters; Dec. 2002; p. 1659- ; vol. 14; No. 12.
Takahashi, H. et al.; Impact of Crosstalk in an Arrayed-Waveguide Multiplexer on N×N Optical Interconnection; Journal of Lightwave Technology; Jun. 1996; p. 1097- ; vol. 14; No. 6.
Okamoto, K. et al.; 32×32 arrayed-waveguide grating multiplexer with uniform loss and cyclic frequency characteristics; Electronics Letters; Oct. 1997; p. 1865- ; vol. 33; No. 22.

(Continued)

*Primary Examiner* — Dalzid Singh (57) ABSTRACT

A network configuration provides arbitration-free all-to-all connection between the nodes of the network utilizing wavelength routing devices and utilizing a limited number of wavelengths for routing optical signals to the nodes of the network.

12 Claims, 6 Drawing Sheets

(56) References Cited

OTHER PUBLICATIONS

Yin, Y. et al.; LIONS: an AWGR-Based Low-Latency Optical Switch for High-Performance Computing and Data Centers; IEEE Journal of Selected Topics in Quantum Electronics; Mar./Apr. 2013; vol. 19; No. 2.

Proietti, R. et al.; An All-Optical Token Technique Enabling a Fully-Distributed Control Plane in AWGR-Based optical Interconnects; Journal of Lightwave Technology; Feb. 2013; vol. 31; No. 3.

Kim, J. et al.; Flattened Butterfly: A Cost-Efficient Topology for High-Radix Networks; ISCA '07; Jun. 9-13, 2007; San Diego, CA, USA.

Reuther, A. et al.; Benchmarking the MIT LL HPCMP DHPI System; HPCMP Users Group Conference; 2007.

Proietti, R. et al.; Scalable Optical Interconnect Architecture Using AWGR-Based TONAK LION Switch with Limited Number of Wavelengths; Journal of Lightwave Technology; Dec. 2013; p. 4087- ; vol. 31; No. 24.

Niwa, T. et al.; Large Port Count Wavelength Routing Optical Switch Consisting of Cascaded Small-Size Cyclic Arrayed Waveguide Gratings; IEEE Photonics Technology Letters; Nov. 2012; p. 2027- ; vol. 24; No. 22.

Proietti, R. et al.; Experimental Demonstration of 8×8 10 Gb/s Low-Latency and Contention-less Wavelength Routing Optical Switch for Data Center Networks; ECOC 2010, Sep. 19-23, Torino, Italy.

Proietti, R. et al.; 40 Gb/s 8×8 Low-latency Optical Switch for Data Centers; OSA/OFC/NFOFC 2011; OMV4.pdf.

Sato, K. et al.; A Large-Scale Wavelength Routing Optical Switch for Data Center Networks; IEEE Communications Magazine; Sep. 2013; p. 46-.

Ye, X. et al.; DOS—A Scalable Optical Switch for Datacenters; ANCS ' 10; Oct. 25-26, 2010, La Jolla CA, USA.

* cited by examiner

LIMITED WAVELENGTH ALL-TO-ALL WAVELENGTH ROUTING NETWORK CONFIGURATION

RELATED APPLICATION

This application claims the benefit of domestic priority of U.S. Provisional Application Ser. No. 61/819,370 filed May 3, 2013 and entitled AWGR-Based All-to-all Optical Interconnects Using Limited Number of Wavelengths which is hereby incorporated by reference in its entirety.

FIELD OF THE INVENTION

This invention is generally directed to a network configuration which provides all-to-all connection between the nodes of the network using a wavelength routing device and a limited number of wavelengths.

BACKGROUND OF THE INVENTION

The landscape of computer network infrastructure consists of a set of trade-offs between scalability, efficiency, throughput, and latency. The advancement of high performance computing (HPC) and data center interconnect fabrics over the past two decades has included two significant developments: (1) large, high-capacity networks based on cascaded electrical packet switches, and, (2) optical fiber transmission media; in particular, wavelength division multiplexing (WDM) is used to further increase the fiber bandwidth. The move to optical interconnect has been a strategy to deal with the frequency-dependent losses of electrical cabling while simultaneously system size has been growing and signaling rates have been increasing. The use of WDM further increases fiber data bandwidth by utilizing the spectrum of transmittance available to encode independent data channels on different wavelengths of light on the same fiber.

Figure 1:
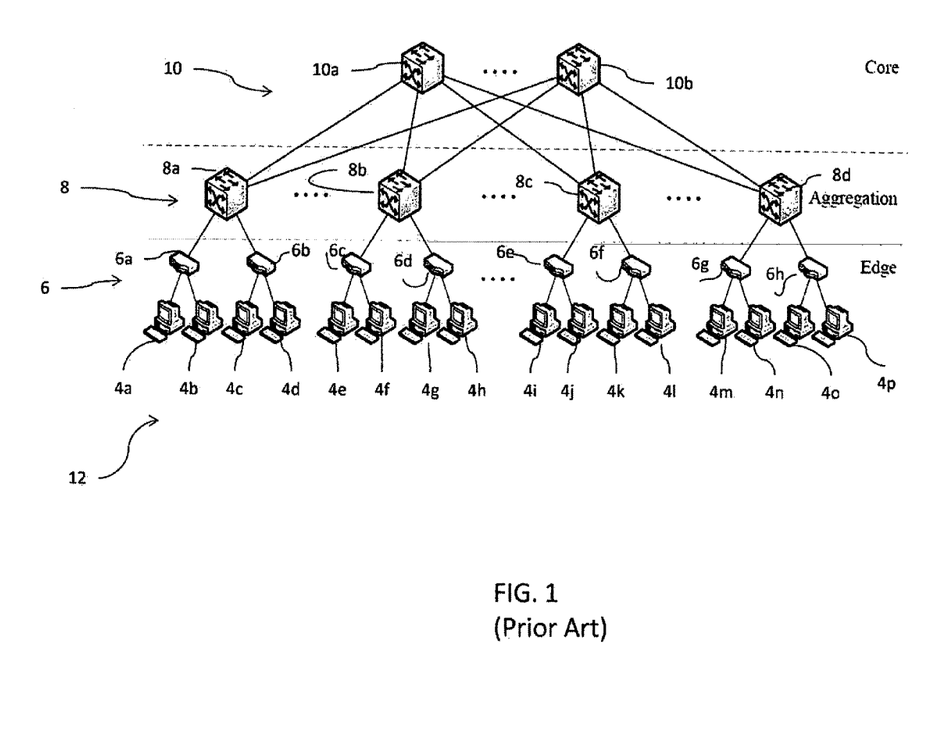
FIG. 1 illustrates a network utilizing cascading switches to provide all-to-all connection.

FIG. 1 illustrates the challenges facing computer networks relying upon electronic switches. The network 12 illustrated in FIG. 1 enables a number of nodes 4 to be interconnected. A "node," consisting of a sub-system of one or more processing elements and memory elements, in the notional networks discussed here resides at a network endpoint. The network provides connectivity between the network endpoints. Furthermore, the networks described here could even be used as the interconnect fabric of the sub-system. In principle, the networks described here can be used to connect any (including possibly heterogeneous) elements of a computing system, e.g. processing elements with storage. In FIG. 1 the nodes 4 represent a set of computers. A communication path is needed between each node 4 and each remaining node 4. First, second and third levels of switches 6, 8, 10 are cascaded to allow communication between each of the nodes 4 and each reaming node 4. In some instances it is only necessary to traverse a single switch to provide communication between two nodes. For example, node 4a may communication with node 4b using only switch 6a. This is referred to as a "two-hop" connection, as two links are traversed in the communication. In other instances several switches must be traversed in order to provide communication between two nodes. For example, node 4a may communicate with node 4p by traversing switch 6a, switch 8a, switch 10a, switch 8d, and switch 6h. This connection is referred to as a 6 hop connection. This route is equivalent to the worst case minimal route for the system shown, and therefore the "diameter" of the network is equal to 6. The communication paths, or links, provided in the network 2 are shared by multiple nodes in the system. As a result, communication across the shared links must be arbitrated. As the networking system is scaled to accommodate a greater number of nodes, an increase in the network's latency occurs and the efficiency of the network suffers.

Figure 2:
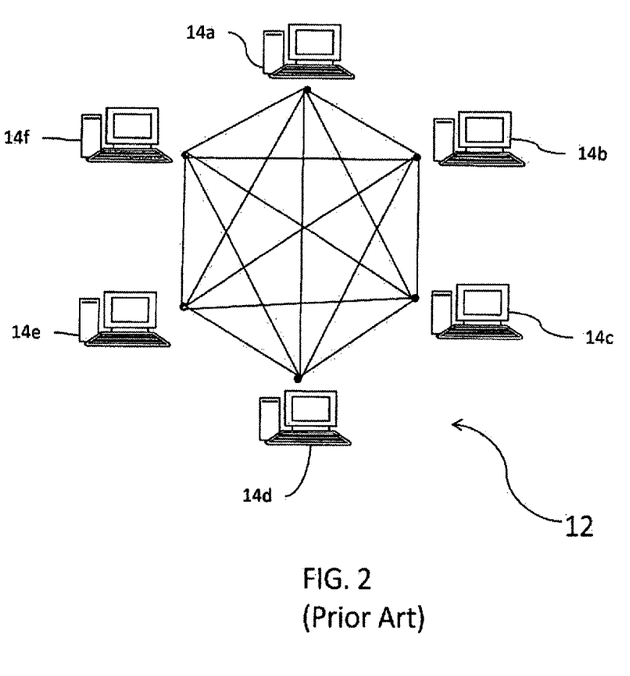
FIG. 2 illustrates a network utilizing directly connected nodes to provide all-to-all connection.

Latency in the network can be minimized by providing all-to-all connection between the nodes in the system. An all-to-all system allows every node to send a unique message to any other node at any time, unaffected by traffic or congestion in the network. A dedicated, switch-free communication path is provided from each node to every other node in the system. Because no switch is required, and no links are shared, resource arbitration of the communication link is not required. Such an arbitration-free network is the densest communication pattern that can be imposed on a computing network system. FIG. 2 illustrates a network 12 demonstrating all-to-all connection. As shown in FIG. 2, the networking system includes six nodes 14. An arbitration-free link is provided from each node 14 to every other node 14 in the system. Because a network having all-to-all connection eliminates concerns regarding blocking or the need for arbitration, these all-to-all networks particularly benefit communication-bound parallel HPC applications when used as the inter-node interconnection network within the HPC system. This type of all-to-all connection is not utilized in a network having a more than approximately 16 nodes, for example, because the interconnection wiring requirements are difficult to implement on a large scale. Specifically, the number of links in such a network is equal to $(N)(N-1)$ if the links provided are unidirectional, or $(N)(N-1)/2$ if the links provided are bidirectional. As the number of nodes is increased linearly, the number of links in the system increases exponentially as $N^2$. When the number of nodes provided is large (e.g. N>16) the number of wires is impractical due to the costs of the wiring, the weight of the wiring, etc.

Figure 3A:
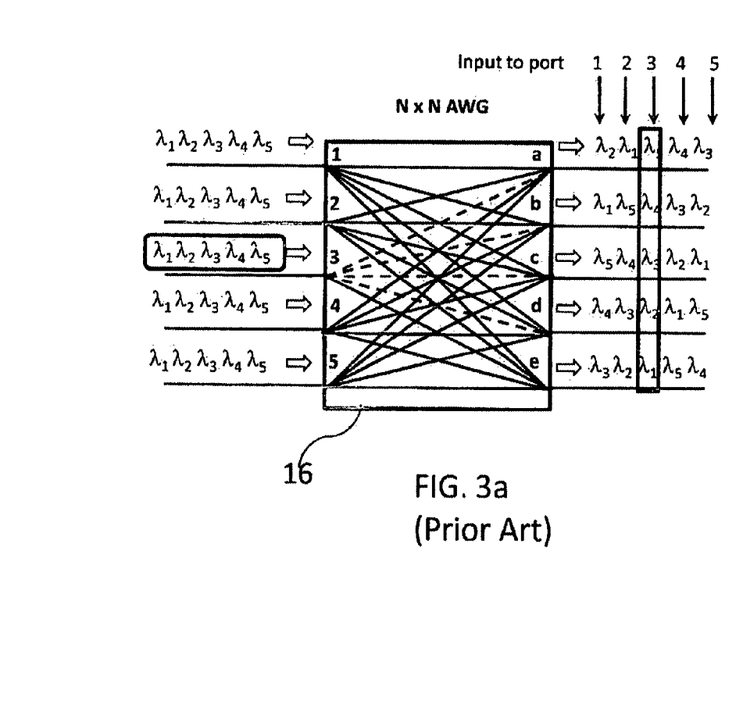
FIG. 3*a* illustrates a W=N AWGR used to provide connection between nodes in a network having N nodes.

Another way in which all-to-all communication has been achieved is with an arrayed wave guide grating router (AWGR). An example of an AWGR 16 is illustrated in FIG. 3a. In this example, the AWGR 16 includes five input ports and five output ports (i.e. a port count of 5). Therefore, the size of the AWGR 16, defined as k×k, is 5×5. The number of ports, k, in the AWGR in principle is limited only by fabrication accuracy and inter-wavelength crosstalk. Each input of the AWGR takes data from the transmitters of a node in the network and each output provides data to the receivers of a node in the network. The signals received at the input ports are optical signals modulated on k different wavelengths. The AWGR performs a static permutation, routing the signals received at each input port to the output ports, such that each of the k signals received at a single input port are distributed to a different of each of the five output pots; signals are routed, not replicated or split and fanned out. Thus, the AWGR 16 provides arbitration-free all-to-all connection among N nodes where N≤k (five nodes in FIG. 3). The AWGR 16 achieves the arbitration-free all-to-all connection by utilizing optical signals having different wavelengths of light. For a contention-free and arbitration-free all-to-all, the number of different wavelengths of light needed is equal to the number of nodes in the system. Thus a five node system (N=5) requires a 5×5 sized AWGR (i.e. k=N) and optical signals of five different wavelengths (W=5). Thus, the AWGR 16 is a W=N AWGR.

Figure 3B:
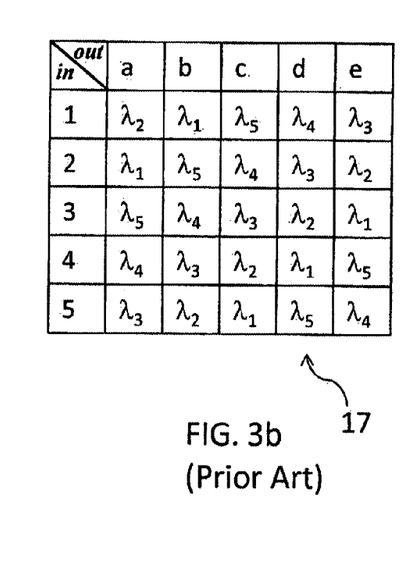
FIG. 3*b* illustrates the routing properties of the AWGR illustrated in FIG. 3*a*.

FIG. 3b illustrates the well-known wavelength routing properties of AWGR 16. The signals provided to each input port of the AWGR 16 are represented in the rows of the table and the signals provided at each output port of the AWGR 16 are represented in the columns of the table. When a system requires a greater number of nodes, the AWGR 16 must be scaled to accommodate the additional nodes. The size of the AWGR 16 must be increased so that an input port and an output port can be provided for each node. In addition, because the number of wavelengths required is equal to the number of nodes (W=N; i.e., the number of wavelengths scales linearly with the number of nodes), additional optical wavelengths must be provided on each input and output port. Difficulties arise, however, when scaling the AWGR 16 to accommodate these additional ports and wavelengths. Specifically, the optical signal band width is limited (i.e. the bandwidth for these communication signals generally ranges from 1310 nm to 1600 nm). An increase in the number of wavelengths (W) routed by the AWGR, results in a reduction to the channel spacing as additional channels must fit within (approximately) the same free spectral range (FSR). With channel spacing reduced, higher precision is required during the AWGR fabrication process. In addition, during use of the AWGR, the reduced channel spacing requires greater accuracy wavelength registration. i.e, the wavelength used by the transmitter, the receiver and the AWGR must be very closely matched. As the wavelength spacing is reduced, achieving the required registration accuracy becomes increasingly difficult. This is particularly true when considering temperature fluctuations which cause the wavelengths to drift.

Although it is possible to provide a system utilizing a W=N AWGR for a 512 node system, the fabrication and implementation of a 512 port AWGR is not practical. Fabrication of a 512 port AWGR presents difficulty from the standpoint of size and the fabrication of 512 input ports and 512 output ports. In addition, the channel spacing requirements for achieving optical signals having 512 different wavelengths is also challenging. The high density channel requirements lead to significant increases of coherent (in-band) and incoherent (out-of-band) crosstalk. This crosstalk significantly impairs the performance of the W=N AWGR as an all-to-all interconnection because of its negative impact on bit error rate (BER).

Another difficulty with utilizing a W=N AWGR to provide an all-to-all network is that such a network would require $512^2$ ($N^2$) transceivers. Each of the N transceivers associated with a node must be supplied with a unique wavelength of light onto which it will modulate its data; therefore each node requires N unique wavelengths. Thus, scaling of the W=N AWGR network to 512 nodes for use in a data center network or an HPC networks, for example, is unrealistic because the channel spacing required to accommodate 512 different wavelengths of light is not realizable.

Yet another difficulty with utilizing a W=N AWGR network configuration is that it requires the use of N lasers to provide signals having W different wavelengths. Use of a laser to generate optical signals results in the formation of heat within the system. The greater the number of lasers utilized the greater the amount of heat generated. Because wavelength registration is affected by fluctuations in temperature, temperature controls are often imposed on these optical systems and may limit the ability to scale the N=W AWGR network configuration.

Thus, a network is needed which provides arbitration-free, all-to-all connection which can be scaled to accommodate an N large enough to be relevant to high performance computing and data center networks.

SUMMARY OF THE INVENTION

Briefly, the present invention discloses a network having a large number of nodes which provides arbitration-free all-to-all connection between the nodes. The network utilizes optical signals and a wavelength routing device, such as for example, an AWGR, to route the optical signals between nodes. Despite the large number of nodes, AWGRs having small input and output port counts may be utilized. In addition, the number of different wavelengths required to transmit information between the nodes is fewer than the number of nodes in the network (by a factor of an integer).

BRIEF DESCRIPTION OF THE DRAWINGS

The organization and manner of the structure and operation of the invention, together with objects and advantages thereof, may best be understood by reference to the following description, taken in connection with the accompanying drawings, wherein like reference numerals identify like elements in which.

DETAILED DESCRIPTION OF THE PREFERRED EMBODIMENT

While the invention may be susceptible to embodiment in different forms, there is shown in the drawings, and herein will be described in detail, specific embodiments with the understanding that the present disclosure is to be considered an exemplification of the principles of the invention, and is not intended to limit the invention to that as illustrated and described herein.

Figure 4:
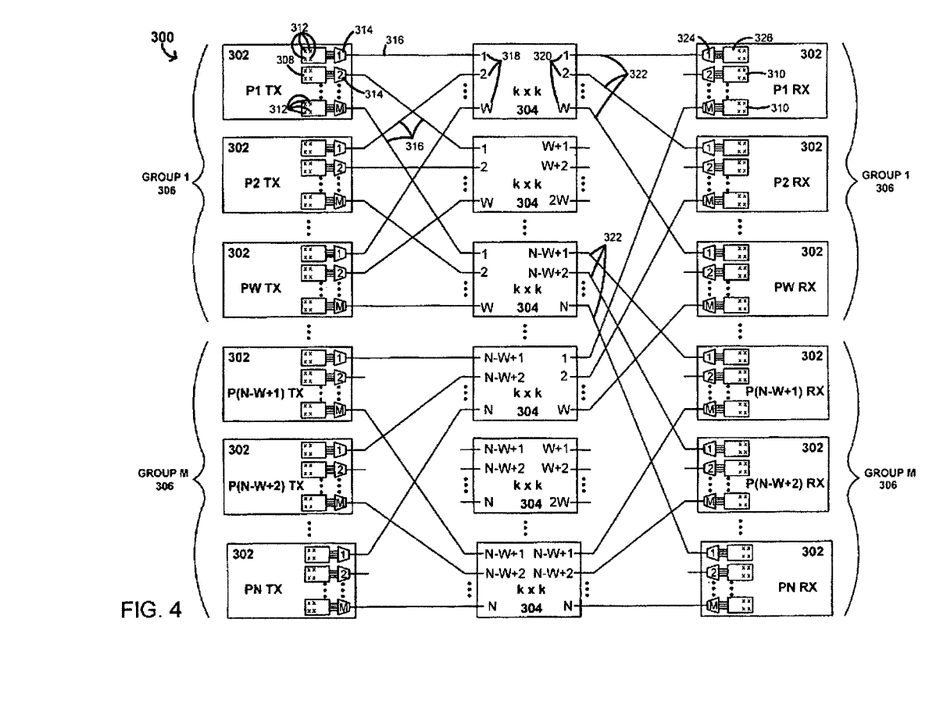
FIG. 4 illustrates the W<N wavelength routing network configuration of the present invention.

The network 300 of the present invention is illustrated in FIG. 4. The network 300 includes N nodes 302 for which all-to-all connection is provided utilizing AWGRs 304. The nodes are identified in FIG. 4 as P1-PN. The nodes 302 represent, for example a processing element along with memory and a network interface (e.g. a computer, blade, or rack), and a WDM optical interconnect link including a transmitter and a receiver. Each node 302 could also represent, for example, a group of nodes in a hierarchy or a storage cluster. Alternatively, each node 302 could represent different types of processing elements, for example, a CPU or a GPU. Alternatively still, the node 302 may represent an interface to another type of network. For example, an element for translating between the HPC interconnect fabric and Ethernet. An "all-to-all" connection as used herein refers to connections within the system 300 which provide dedicated, unshared, arbitration-free communication between each node 302 of the system 300 and each of the remaining nodes 302 of the system 300. For clarity, a transmitter portion of each node 302 is illustrated on the left hand side of the drawing and a receiver portion of each node 302 is illustrated in the right hand side of the drawing, i.e. P1_TX and P1_RX are two portions of the same node, specifically the transmitter and receiver portions respectively.

The size of each AWGR 304 is k×k, where k represents the number of input ports or output ports provided by the AWGR 304. It is noted that the AWGR 304 is designed to route k different wavelengths, from the input ports of the AWGR to the output ports of the AWGR 304. The number of different wavelengths of signals which will be routed by the system 300 will be denoted as W. In the system 300, the number of different wavelengths W utilized to route optical signals between the nodes 302 is less than or equal to the number of wavelengths k for which the AWGR 304 is designed for routing optical signals (i.e., W≤K). In addition, the number of wavelengths W utilized by the network 300 for routing optical signals is less than the number of nodes N provided by the network (W<N). The network has therefore been termed a "limited wavelength network" i.e., a W<N wavelength routing network." Although the invention has been described herein as including an AWGR, it is to be understood that the invention may be implemented utilizing other wavelength routing devices, such as for example, diffraction gratings, Echelle gratings, or prisms.

The nodes 302 of the W<N wavelength routing network are divided into M groups 306, where each group 306 includes W nodes 302. Each node 302 includes M transmitter banks 308 and M receiver banks 310. Each transmitter bank 308 provides W transmitters 312 for transmitting W optical signals of W different wavelengths. The signals transmitted by the transmitters 312 of each transmitter bank 308 are multiplexed by an optical wavelength multiplexer 314 and provided to an input transmission medium 316 such as, for example, an optical waveguide or fiber, and connected to an input port 318 of an AWGR 304. Signals are routed by the AWGRs 304 and provided at the AWGR output ports 320. An output transmission medium 322, such as, for example, an optical waveguide or fiber is provided at each output port 320 of the AWGR. Optical signals of W different wavelengths are provided at each output port 320 of the AWGR to the transmission medium 322 and received by an optical wavelength de-multiplexer 324 and a receiver bank 310. The receiver bank provides W receivers 326. The de-multiplexer 324 de-multiplexes the optical signals to provide W optical signals each having a different wavelength. Each of these optical signals is received by a receiver 326 of the receiver bank 310 of the designated node 302.

As illustrated in FIG. 4, the AWGRs are divided into M groups as well. The AWGRs of group 306 together provide N input ports and N output ports. Each node of a group 306 transmits signals to each AWGR 304 within the group 306. The AWGRs 304 of that group 306 route signals received by the AWGRs 304 to receivers of each of the nodes 302 of the system 300. The routing of the signals from the transmission portions of the nodes to the receiver portions of the nodes is therefore asymmetric. Specifically for each connection on the transmission side, the W transmitters in bank j (1≤j≤M) of node k (1≤k≤N) are connected to the $j^{th}$ input port k in the same group. However, the W receivers of the bank j (1≤j≤M) of node k (1≤k≤N) are connected to the output port k of the AWGR group j. The input ports of the AWGRs are numbered the same as the W nodes in the same group, and are repeated M times in one group, while the output ports of the AWGRs are numbered repetitively from 1 to N for all the M groups.

Figure 5:
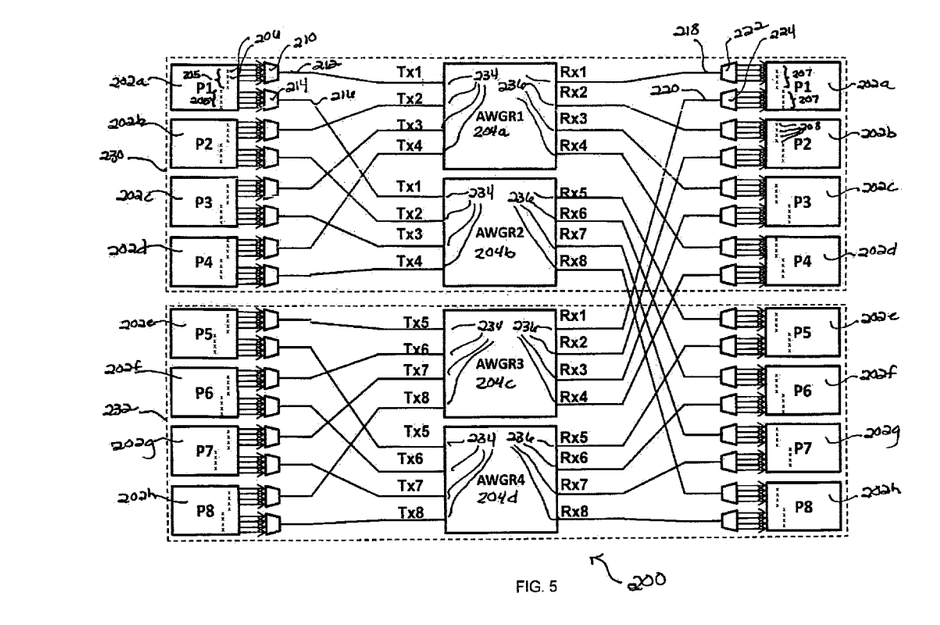
FIG. 5 illustrates a specific example of the network configuration illustrated in FIG. 4.

A specific example of the network 300 is illustrated in FIG. 5. For clarity of illustration the example network 200 includes a limited number of nodes; i.e. eight nodes 202a-202h (N=8). The AWGRs 204 of the network 200 are selected to be sized 4×4 AWGRs 204. i.e., each of the AWGRs 204 include four input ports 234 and four output ports 236 and are designed to route optical signals having four different wavelengths (A,B, C,D). Thus, the number of different wavelengths, W, of signals processed by the network 300 is four (i.e., W=4). As with FIG. 4, for purposes of clarity, a portion of each node 202 is illustrated on the left hand side of the drawing and a portion of each node 202 is illustrated on the right hand side of the drawing.

The nodes 202 are divided into two groups (M=2) wherein each group includes W nodes 202. A first group 230 includes nodes 202a-202d and a second group 232 includes nodes 202e-202h.

Each node 202 includes M transmitter banks 205 and M receiver banks 207. Each transmitter bank includes four transmitters 206 for transmitting four optical signals of four different wavelengths. The signals transmitted by transmitters 206 of the first transmitter bank 205 are multiplexed by a multiplexer 210 and provided to a first optical fiber 212. The signals transmitted by the second transmitter bank 205 are multiplexed by a multiplexer 214 and provided to a second optical fiber 216. The first optical fiber 212 provides signals having four different wavelengths to an input node of the first AWGR 204a. The second optical fiber 216 provides signals having four different wavelengths to an input node of the second AWGR 204b. Transmitters associated with each of the remaining nodes 202b-202d are multiplexed in a similar manner and provided to the input ports of each of the AWGRS 202a, 202b of the first group of nodes 230.

Signals are routed by the AWGRs 204 and provided to the output ports 236 of the AWGRs 204. Specifically, signals routed by the AWGR 204a to a first output port 236 (comprised of one signal from each input port 234 of AWGR 204a) are provided to a first de-multiplexer associated with node 202a; signals routed by the AWGR 204a to a second output port 236 are provided to a first de-multiplexer associated with node 202b; signals routed by the AWGR 204a to a third output port 236 are provided to a first de-multiplexer associated with node 202c; and signals routed by the AWGR 204a to a fourth output port 236 are provided to a first de-multiplexer associated with node 202d. Nodes 202a-202d of the first group 230 transmit to nodes 202e-202h of the second group 232 via AWGR 204b. Specifically, signals routed by the AWGR 204b to a first output port 236 are provided to a first de-multiplexer associated with node 202e; signals routed by the AWGR 204b to a second output port 236 are provided to a first de-multiplexer associated with node 202f; signals routed by the AWGR 204b to a third output port 236 are provided to a first de-multiplexer associated with node 202g; and signals routed by the AWGR 204b to a fourth output port 236 are provided to a first de-multiplexer associated with node 202h.

Information from nodes 202e-h of the second group 232 of the system 200 is transmitted to each of the remaining nodes 202a-202h in the same manner as that described with respect to information transmitted by nodes 202a-202d. Nodes 202e-202h of the second group 232 transmit to the nodes 202a-d of the first group 230 via AWGR 204c. Specifically, signals routed by the AWGR 204c to a first output port 236 are provided to a second de-multiplexer associated with node 202a; signals routed by the AWGR 204c to a second output port 236 are provided to a second de-multiplexer associated with node 202b; signals routed by the AWGR 204c to a third output port 236 are provided to a second de-multiplexer associated with node 202c; and signals routed by the AWGR 204c to a fourth output port 236 are provided to a second de-multiplexer associated with node 202d. Nodes 202e-202h of the second group 230 transmit to the nodes 202e-h of the second group 232 via AWGR 204d. Specifically, signals routed by the AWGR 204d to a first output port 236 are provided to a second de-multiplexer associated with node 202e; signals routed by the AWGR 204d to a second output port 236 are provided to a second de-multiplexer associated with node 202f; signals routed by the AWGR 204d to a third output port 236 are provided to a second de-multiplexer associated with node 202g; and signals routed by the AWGR 204d to a fourth output port 236 are provided to a second de-multiplexer associated with node 202h.

Each de-multiplexer 222, 224 of each node 202a-h receives four signals on the same medium 218, 220, wavelength multiplexed onto wavelengths A, B, C and D. Each optical wavelength de-multiplexer de-multiplexes the received signals to provide four signals on 4 different media (e.g. 4 waveguides) each having a distinct wavelength A, B, C or D. Each of these signals having a distinct wavelength is provided to a receiver 208 of a receiver bank of a node 202. It is noted that if receiver provides a broadband photodetector a wavelength-specific receiver is not required.

Figure 6:
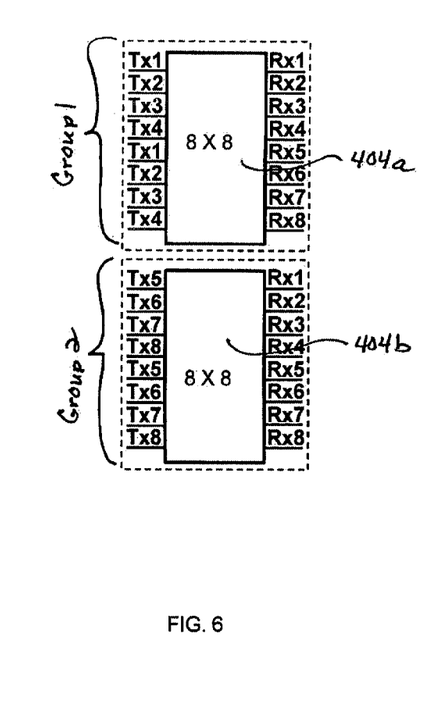
FIG. 6 illustrates an alternative design for the W<N wavelength routing network configuration illustrated in FIG. 5.

FIG. 5 illustrates a specific example of a network which achieves all-to-all connection of a system having eight nodes utilizing 4×4 sized AWGRs 204a, 204b, 20c, 204d. Thus, k=4 for the AWGRs illustrated in FIG. 5. FIG. 6 illustrates that the AWGRs 204a-204d of the system 200 can be removed and replaced with two sized 8×8 AWGRs 404a, 404b; Thus, k=8 for each AWGR 404a, 404b. As discussed in connection with the system 200, however, the nodes 202a-202h transmit and receive signals having only four different wavelengths (A, B, C, and D). The nodes 202a-h remain divided into a first group 230 and a second group 232 each group including W nodes. Unlike the system 200 which provides a first and second AWGR 204a, 204b for receiving signals from nodes 202a-202d, the system 400 provides a single AWGR 404a for receiving signals from nodes 202a-202d. And, unlike the system 200 which provides a first AWGR 204a for routing signals received from nodes 202a-202d to nodes 202a-202d and a second AWGR 204b for routing signals received from nodes 202a-202d to nodes 202e-202h, the system provided by the substitution illustrated in FIG. 6 utilizes a single AWGR 404a to route signals received from nodes 202a-202d to nodes 202a-e. Thus, the network of FIG. 6 compresses the signals routed by two size 4×4 AWGRs 204a, 204b into a single 8×8 AWGR 404a. Similarly, the system provided by the substitution illustrated in FIG. 6 utilizes a single AWGR 404b to route signals received from nodes 202e-202h to nodes 202a-e. Thus, the network of FIG. 6 compresses the signals routed by two sized 4×4 AWGRs 204c, 204d into a single 8×8 AWGR 404b.

Figure 7:
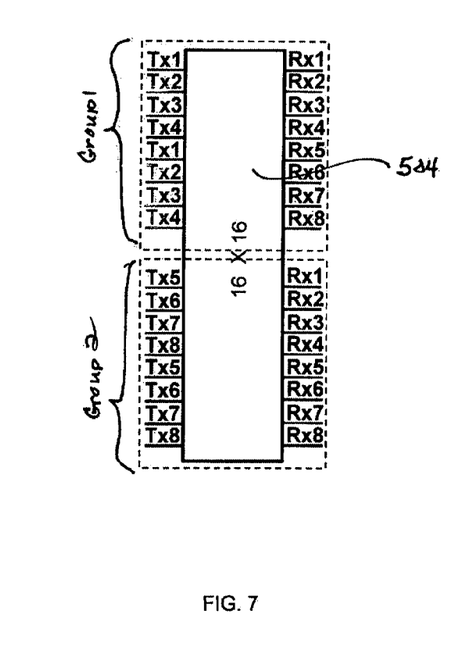
FIG. 7 illustrates another alternative design for the W<N wavelength routing network configuration illustrated in FIG. 5.

FIG. 7 illustrates that the AWGRs 204a-204h of the system 200 can be removed and replaced with one sized 16×16 AWGR 504; i.e. k=16. As discussed in connection with the system 200, however, the nodes 202a-202h transmit and receive signals having only four different wavelengths (A, B, C, and D). Thus, as with the system illustrated in FIG. 5, W=4 for the system illustrated in FIG. 7. The nodes 202a-h remain divided into a first group 230 and a second group 232 each group including W nodes. Unlike the system 200 which provides a first, second, third and fourth AWGRs for receiving signals from nodes 202a-202h, the system 400 provides a single AWGR 504 for receiving signals from nodes 202a-202h. And, unlike the system 200 which provides a first AWGR 204a for routing signals received from nodes 202a-202d to nodes 202a-202d and a second AWGR 204b for routing signals received from nodes 202a-202d to nodes 202e-202h the system of FIG. 8 utilizes a single AWGR 504 to route signals received from nodes 202a-202h to nodes 202a-h. Thus, the network of FIG. 7 compresses the signals routed by four sized 4×4 AWGRs 204a, 204b, 204c, 204d into a single 16×16 AWGR 504.

FIG. 5-7 illustrate specific examples of network configurations (a), (b), and (c) below which achieve all-to-all connection of a system having eight nodes. More generally, where N is an integer times larger than W, the user may select the number of wavelength routing devices to implement in the design from the following:

(a) $N^2/W^2$ number of AWGRs of size W×W each;
(b) N/W number of AWGRs of size N×N each; or
(c) 1 AWGR of size $(N^2/W)\times(N^2/W)$.

A comparison of the parameters provided for each of the configurations illustrated in FIGS. 5-7 is provided in Table 1. Table 1 also provides a comparison of the prior art directly connected network illustrated in FIG. 2 and the prior art W=N all-to-all network illustrated in FIG. 3.

TABLE 1

Comparison of the parameters of different network configurations.

|  | Directly Connected Network Configuration (FIG. 2) | W = N all-to-all AWGR Network Configuration (FIG. 3) | W < N All-to-all Wavelength Routing Network Configuration (FIG. 5) | W < N All-to-all Wavelength Routing Network Configuration (FIG. 6) | W < N All-to-all Wavelength Routing Network Configuration (FIG. 7) |
|---|---|---|---|---|---|
| # of Nodes | N | N | N | N | N |
| # of TX/RX | $N^2$ | $N^2$ | $N^2$ | $N^2$ | $N^2$ |
| # of WLs | 1 | N | W | W | W |
| Routing device port count | N/A | N | W | N | $N^2/W$ |
| # of AWGRs | N/A | 1 | $N^2/W^2$ | N/W | 1 |
| # of crosstalk components | N/A | N-1 | W-1 | N-1 | $N^2/W-1$ |
| Total fibers | N(N-1) | 2N | $2N^2/W$ | $2N^2/W$ | $2N^2/W$ |
| Total I/O ports | N/A | N | $N^2/W$ | $N^2/W$ | $N^2/W$ |

As illustrated by the data presented in Table 1, when comparing the limited wavelength all-to-all network configuration of the present invention to a directly connected network configuration, the invention provides the primary benefit of reducing the number of fibers needed by a factor of approximately W/2. In addition, the limited wavelength all-to-all AWGR network configuration of the present invention is passive, and therefore is highly power efficient and has lower latency in comparison to the network configuration illustrated in FIG. 1 which utilizes electronic switches.

When comparing the limited wavelength all-to-all wavelength routing network configuration of the present invention (i.e., the W<N wavelength routing network configuration illustrated in FIGS. 5-7) to the W=k=N all-to-all AWGR network configuration (i.e., the network configuration illustrated in FIG. 3), the present invention allows for a reduction in the size of the AWGRs required for routing data between nodes. Specifically, for the W=N all-to-all AWGR network configuration illustrated in FIG. 3, the port count of the AWGR must be N whereas the port count of the AWGRs of limited wavelength routing network configuration illustrated in FIG. 4 is less than N. As discussed above, because the W=N AWGR network configurations requires the port count k of the AWGR to match the number of nodes N of the system (W=N=k), scaling up of the system is impractical due to fabrication and other practical and operational constraints. Thus, the desired reduction in AWGR port count from N to W is achieved using the W<N wavelength routing network configuration. Using AWGRs having smaller port counts eliminates the issues associated with fabricating large AWGRs having a large port count, relaxes thermal constraints on the system, reduces issues associated with crosstalk, and reduces the number of unique wavelength lasers required by the transmitters of the system.

In addition to reducing the port count of the AWGRs utilized by the network configuration, the limited wavelength all-to-all wavelength routing configuration provides a reduction in the number of unique wavelengths required by the system to provide the all-to-all connection. The N=W AWGR configuration requires a different wavelength for every node in the system. As discussed above, control on channel spacing in fabrication makes the use of an AWGR for routing signals having a large number of different wavelengths difficult. In the W<N wavelength routing configuration, significant reduction in the number of wavelengths required to be used is achieved (i.e. a reduction from N to W). Because the user may designate the number of wavelengths to be utilized by the system, the reduction is essentially unlimited, subject to the challenges already discussed with a large AWGR. The user may, therefore, select the number of wavelengths utilized to achieve the desired channel spacing.

Because the user may choose to limit the number of wavelengths utilized by the W<N wavelength routing network configuration, the difficulties with accurate wavelength registration for all channels after fabrication are diminished and the signal crosstalk beat noises which accumulate among the nodes of the N=W all-to-all configuration is avoided. Thus, the number of nodes in the limited wavelength routing network configuration can be increased without impacting the -crosstalk on the nodes and without increasing the required temperature control for the system.

Although the present invention results in the use of multiple wavelength routing devices instead of a single AWGR, the interconnection network remains a flat hierarchy, i.e. the hop distance between any two nodes is fixed at two. Thus, as the number of nodes is increased, the hop count and diameter of the network remains fixed. Therefore, the network of the present invention provides a very low latency.

Finally, using a small number of wavelength routing devices rather than a single AWGR provides the advantage of dispersing the required optical connections over multiple routing devices, thereby simplifying the process of making the fiber connections.

While embodiments of the present invention are shown and described, it is envisioned that those skilled in the art may devise various modifications of the present invention without departing from the spirit and scope of the appended claims.

The invention claimed is:

1. A network configuration comprising:
    a plurality of nodes, each node including a plurality of banks of transmitters and a plurality of banks of receivers, said transmitters transmitting signals having a plurality of different wavelengths and said receivers receiving said transmitted signals, wherein the number of different wavelengths of the transmitted signals is less than the number of nodes and wherein a multiplexed signal is associated with each bank of transmitters;
    a wavelength routing device having input ports in communication with said transmitters and output ports in communication with said receivers, said routing device routing signals transmitted by said transmitters from said input ports to said output ports; and
    wherein a first bank of transmitters of a first node is in communication with a first input port and a second bank of transmitters of said first node is in communication with a second input port.

2. The network configuration of claim 1, wherein said network configuration provides all-to-all connection of said nodes.

3. The network configuration of claim 1, wherein said wavelength routing device is an arrayed waveguide grating router.

4. The network configuration of claim 1, wherein optical signals transmitted from a single node are received by a plurality of wavelength routing devices.

5. A network configuration as defined in claim 4, wherein the number of routing devices included in the network is defined by $N^2/W^2$, where N represents the number of nodes and W represents the number of wavelengths of the transmitted signals.

6. A network configuration as defined in claim 4, wherein said nodes and said wavelength routing devices are grouped into a plurality of groups; wherein said input ports of each said group of wavelength routing devices is in communication with transmitters of a single group of nodes and said output ports of each said group of wavelength routing devices is in communication with receivers from each of said groups of nodes.

7. A network configuration as defined in claim 6, wherein the number of nodes grouped in a group is limited by the number of different wavelengths of the transmitted signals.

8. The network configuration of claim 4, wherein the number of input ports provided by each said wavelength routing device is fewer than the number of nodes.

9. The network configuration of claim 1:
    wherein as the number of nodes increases a network diameter is fixed.

10. The network configuration of claim 9, wherein the diameter of said network is 2.

11. The network configuration of claim 1, wherein the total number of fibers required to implement the network is defined by $2 N^2/W$, where N represents the number of nodes and W represents the number of wavelengths of the transmitted signals.

12. The network configuration of claim 1, wherein said transmitters transmit signals of a fixed wavelength.

* * * * *